US012753630B2

(12) United States Patent
Huang et al.

(10) Patent No.: US 12,753,630 B2
(45) Date of Patent: Oct. 6, 2026

(54) SELF-LOCKING MODULE DEVICE

(71) Applicant: ALPHA NETWORKS INC., Hsinchu (TW)

(72) Inventors: Hao Huang, Chengdu (CN); Shenquan Zheng, Chengdu (CN); Chih-Kuang Wang, Hsinchu (TW)

(73) Assignee: ALPHA NETWORKS INC., Hsinchu (TW)

( * ) Notice: Subject to any disclaimer, the term of this patent is extended or adjusted under 35 U.S.C. 154(b) by 43 days.

(21) Appl. No.: 18/892,014

(22) Filed: Sep. 20, 2024

(65) Prior Publication Data

US 2025/0230681 A1 Jul. 17, 2025

(30) Foreign Application Priority Data

Jan. 11, 2024 (CN) ......................... 202410043862.6

(51) Int. Cl.
*E05B 9/02* (2006.01)
*E05B 1/00* (2006.01)

(52) U.S. Cl.
CPC ................ *E05B 9/02* (2013.01); *E05B 1/003* (2013.01)

(58) Field of Classification Search
CPC ......... E05B 9/02; E05B 1/003; H05K 5/0217; H05K 5/03
USPC ............................................................ 70/114
See application file for complete search history.

(56) References Cited

U.S. PATENT DOCUMENTS 1,997,528 A * 4/1935 Lovatt ...................... E05B 17/14 70/455
3,276,835 A * 10/1966 Hall .......................... G07F 9/06 292/37
3,884,515 A * 5/1975 Ashkenazi ................ E05C 9/14 292/183
3,977,749 A * 8/1976 Langenbach ........ H01R 13/193 439/372
9,152,189 B2 * 10/2015 Fan ......................... G06F 1/187
11,398,395 B2 * 7/2022 Smith ............... H01L 21/67373

FOREIGN PATENT DOCUMENTS

CN 209435196 U 9/2019
CN 212399514 U 1/2021

* cited by examiner

*Primary Examiner* — Kristina R Fulton
*Assistant Examiner* — Thomas L Neubauer
(74) *Attorney, Agent, or Firm* — Birch, Stewart, Kolasch & Birch, LLP

(57) ABSTRACT

A self-locking module device includes a box body, a module base, and a rotary driving structure. The box body has a module space and an opening. The module base includes a cover body. The rotary driving structure is disposed on the cover body and includes a rotary plate and a rotary handle. The rotary handle is rotated to drive the rotary plate to rotate, thereby two movable latches on two sides of the rotary plate are driven to retract from at least one locking hole of the box body. At that time, the module base could be pulled out from the box body through the rotary handle. When the module base is pushed to return into the box body, the two latches on the two sides of the rotary plate abut against a peripheral edge of the opening to retract and then are inserted into the locking holes.

12 Claims, 15 Drawing Sheets

SELF-LOCKING MODULE DEVICE

BACKGROUND OF THE INVENTION

Technical Field

The present invention relates generally to a handle-driving mechanism, and more particularly to a self-locking module device.

Description of Related Art

Nowadays, mainstream module-fixing structures in the market could be categorized into two kinds, wherein one of the two kinds of the mainstream module-fixing structures is fixed by screwing. For example, the Chinese utility model patent CN209435196U "LC filter compensation module group" discloses a module group, wherein the module group includes a housing body. A handle is disposed on a top end of an outer surface of the housing body. Four first fixing bolts are disposed on a side of the outer surface of the housing body. Two side cover boards are disposed on two sides of the housing body. The two side cover boards and the housing body are connected and fixed through the first fixing bolts. The module group is disassembled through a plurality of bolts. The handle is provided for carrying the module group.

The other kind of the mainstream module-fixing structures is fixed by a buckle. For example, the Chinese utility model patent CN212399514U "Portable trolley with modular toolbox" discloses a modular tool box, wherein the modular tool box includes a box body, a box cover, and a handle. At least one front-displacement female buckle is disposed on a front side of the box cover. At least one buckle-matching device is disposed on a front side of the box body. The at least one buckle-matching device corresponds to a location of the at least one front displacement female buckle on the box cover and matches with the at least one front-displacement female buckle. The modular toolbox is disassembled through at least one buckle-matching device. The handle is only adapted to separate the box cover from the box body by applying a force. The handle is not directly related to fastening the modular tool box.

The two aforementioned structures could fix the box body. However, when the cover body is about to be separated from the box body, it is required to remove the bolts by using a tool or separate the buckle-matching device, so that the cover body could not be quickly separated from the box body; when the cover body is about to be combined with the box body, it is also required to fasten the bolts or the buckle-matching device, so that the cover body could not be automatically fastened to the box body. As a result, the inconvenience for assembling or disassembling the module group or the modular tool box is resulted. As a result, how to provide a module device, which could be automatically fastened and be quickly separated, is a problem needed to be solved.

BRIEF SUMMARY OF THE INVENTION

In view of the above, the primary objective of the present invention is to provide a self-locking module device, wherein the self-locking module device could be automatically fastened and a box body and a cover body could be quickly separated, thereby bringing convenience in using the self-locking module device.

The present invention provides a self-locking module device including a box body, a module base, and a rotary driving structure, wherein the box body includes a bottom board, a top board, and two lateral boards. The bottom board, the top board, and the two lateral boards surround to form a module space and an opening communicating with the module space. At least one of the two lateral boards has at least one locking hole. The module base includes a cover body and a bottom frame, wherein the cover body is connected to the bottom frame. When the module base is combined with the box body, the cover body is stuck at the opening and the bottom frame abuts against the bottom board. The cover body has a cover board, wherein the cover board closes the opening. A side of the cover board facing the module space is defined as an inner side, and the other side of the cover board away from the module space is defined as an outer side. The cover board has a penetrated portion. The rotary driving structure is disposed on the cover body and includes a rotary plate, a rotary handle, at least one latch, and at least one spring, wherein the rotary plate has a rotation center portion. At least one pin is combined with a periphery of the rotation center portion of the rotary plate. The rotary plate is disposed on the inner side of the cover board and the rotation center portion of the rotary plate is rotatably disposed on the penetrated portion. A part of the rotary handle penetrates through the penetrated portion and is combined with the rotary plate. At least one track device is formed between the at least one latch and the cover board and the at least one latch is movable in a straight line. An outer end portion of the at least one latch has at least one tongue, wherein the at least one tongue protrudes out of a periphery of the cover board and is inserted into the at least one locking hole. An inner end portion of the at least one latch comprises a displacement hole. The at least one pin penetrates through the displacement hole of the at least one latch. The displacement hole has a first end and a second end, wherein the at least one pin is located at the first end. A distance between the first end and a center of the rotation center portion is a first length. A distance between the second end and the center of the rotation center portion is a second length. The second length is greater than the first length. The at least one spring is adapted to drive the at least one pin to tend to move towards the first end of the displacement hole of the at least one latch.

With the aforementioned design, when the box body is combined with the module base, the cover body is pushed to the opening and the two latches of the two sides of the rotary plate protrude outward to be fastened to the box body, so that a function of automatically fastening could be achieved, thereby enhancing the convenience. When the rotary handle is rotated to drive the rotary plate to rotate, so that the two latches of the two sides of the rotary plate are driven to retract inwards, so that the module base and the box body are unlocked. The self-locking module device of the present invention could be locked and unlocked simply by rotating the rotary handle without other complicated procedures that a plurality of bolts needs to be removed by using a tool or a buckle-matching device needs to be separated. In this way, the user could use the self-locking module device of the present invention more intuitively and conveniently.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
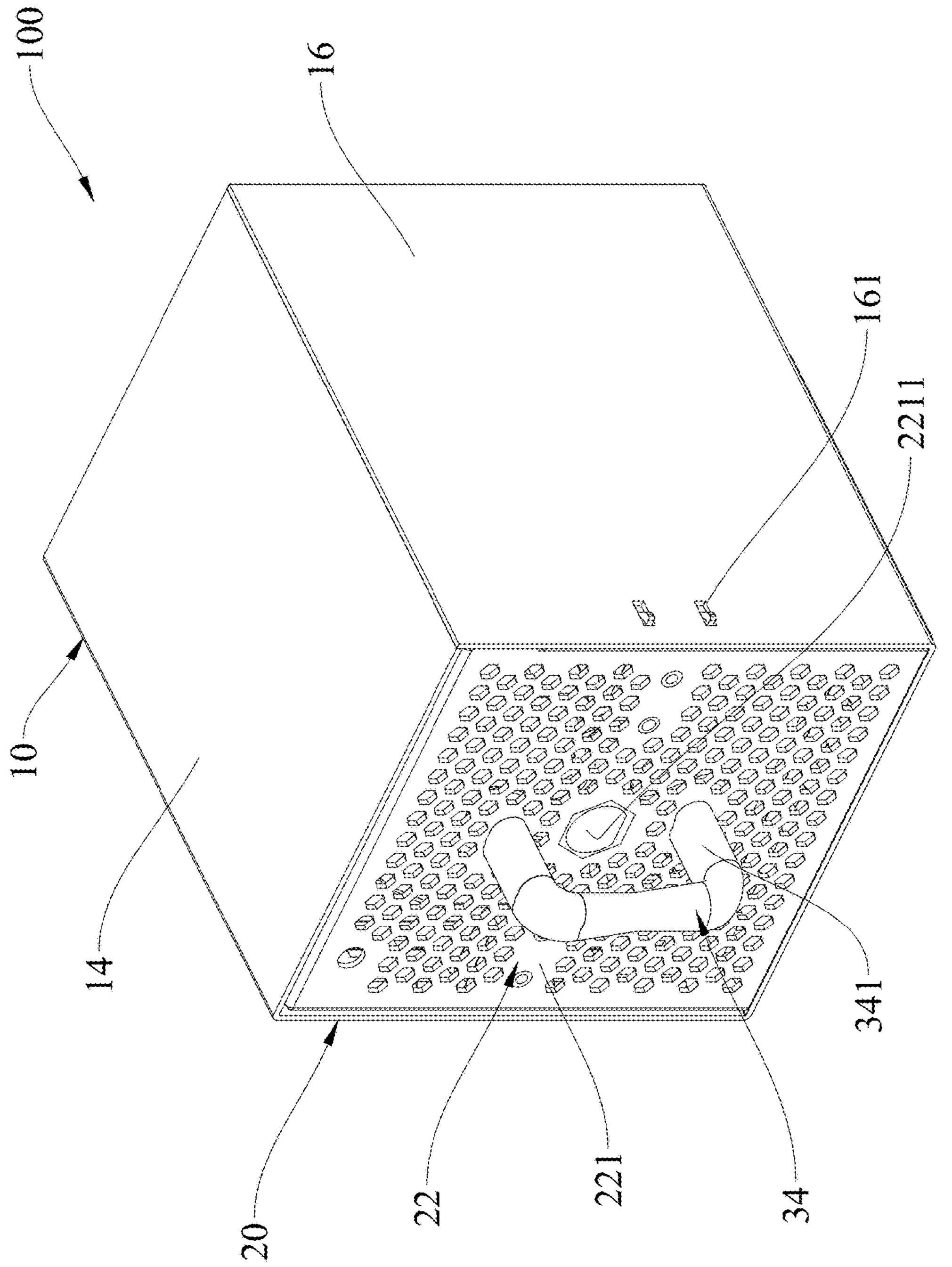
FIG. 1 is a perspective view of the self-locking module device according to a first embodiment of the present invention.
Figure 2:
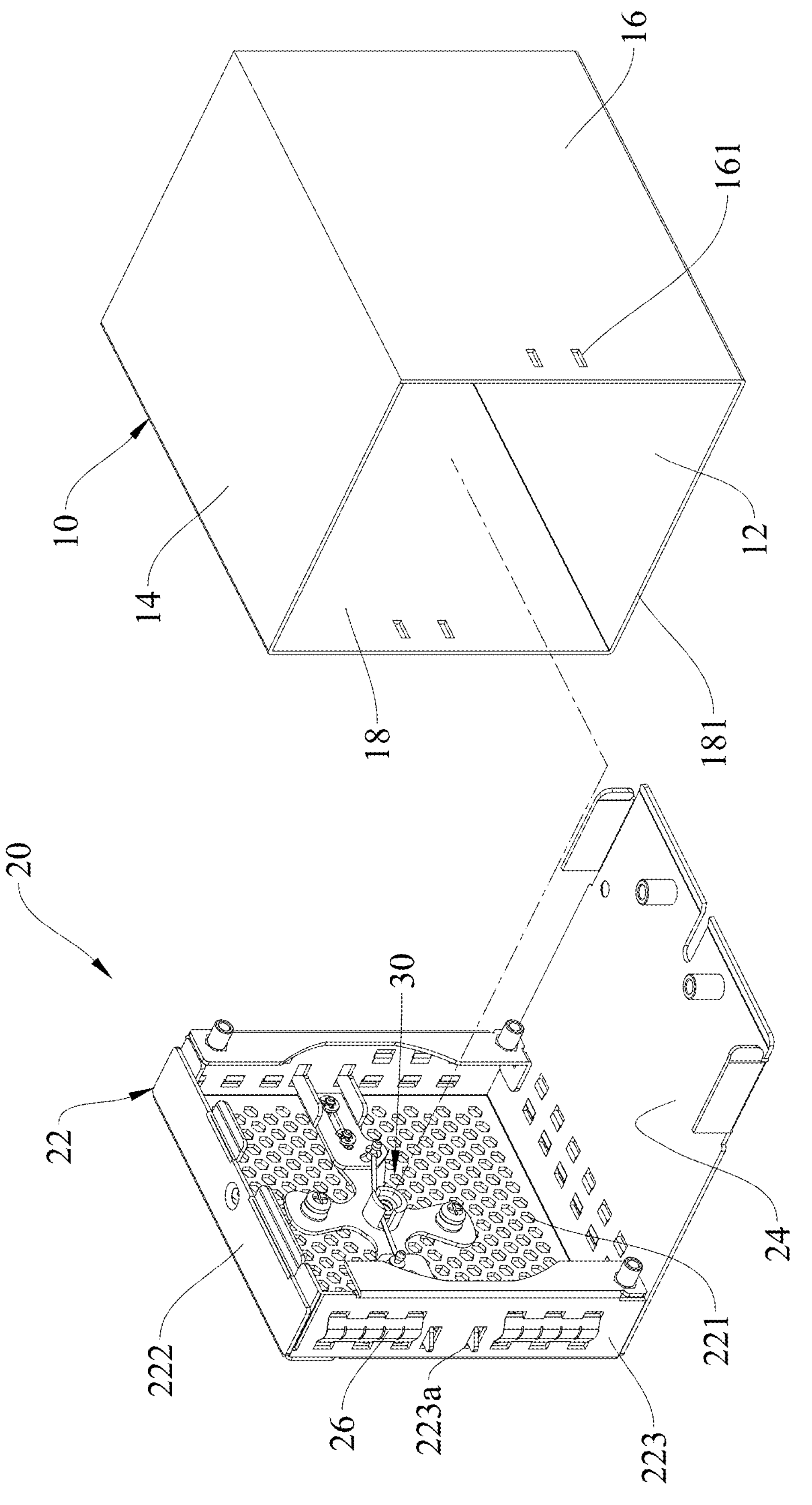
FIG. 2 is a schematic view showing that the box body and the module base are separated according to the first embodiment of the present invention.

A self-locking module device 100 according to a first embodiment of the present invention is illustrated in FIG. 1 and FIG. 2 and includes a box body 10, a module base 20, and a rotary driving structure 30, wherein the module base 20 is detachably combined with the box body 10. The box body 10 and the module base 20 are provided for an electronic module or a mechanical module to be mounted. When the module base 20 is pushed into the box body 10 to be combined with the box body 10, the module base 20 is automatically fastened to the box body 10 through the rotary driving structure 30.

The box body 10 includes a bottom board 12, a top board 14, and two lateral boards 16, wherein the bottom board 12, the top board 14, and the two lateral boards 16 surround to form a module space 18 and an opening 181 communicating with the module space 18. Each of the two lateral boards 16 has two locking holes 161, wherein the two locking holes 161 of each of the two lateral boards 16 are located near the opening 181. In other embodiments, each of the two lateral boards 16 could be provided with only one locking hole 161.

Figure 3:
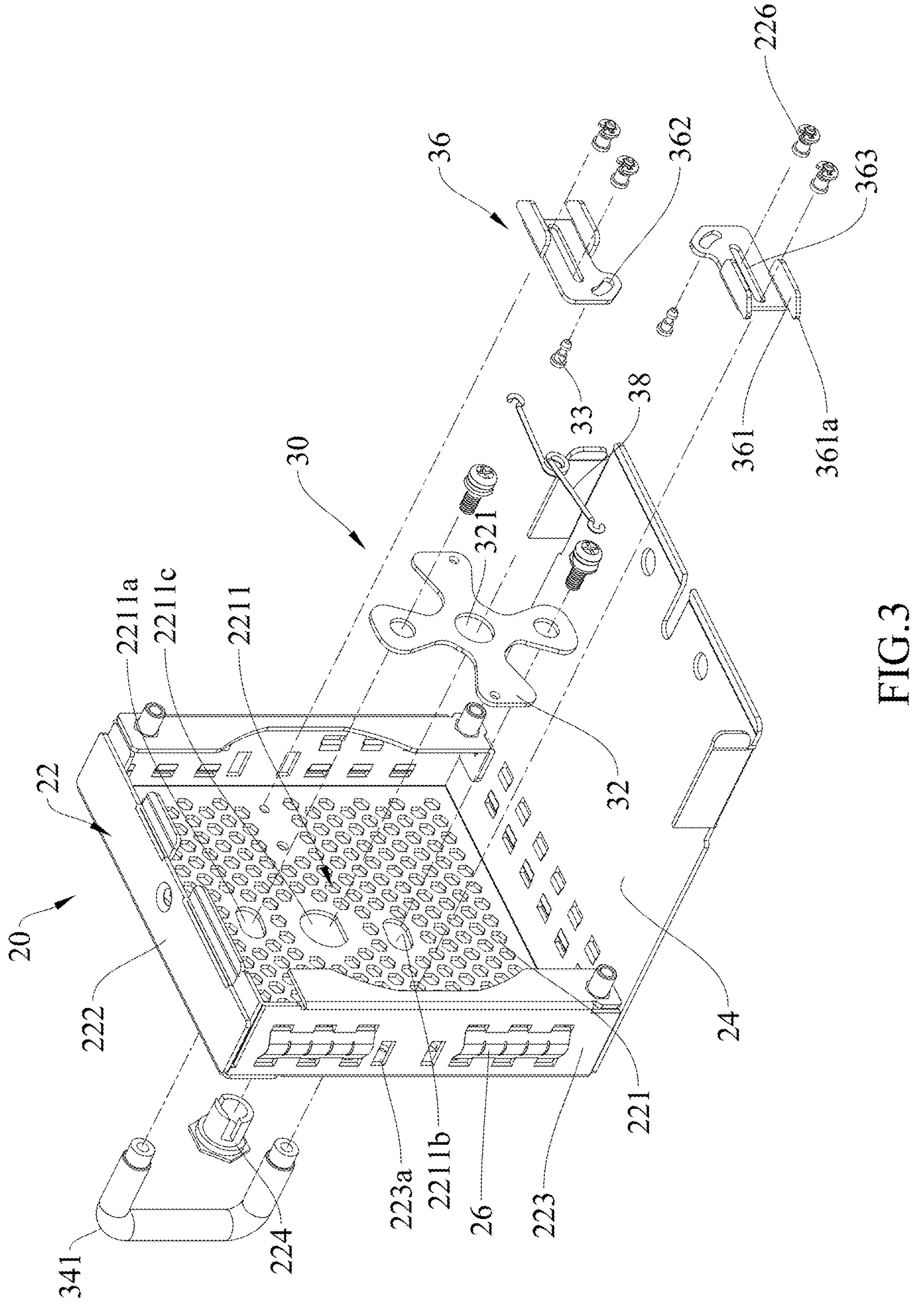
FIG. 3 is an exploded view of a part of the self-locking module device in FIG. 2.
Figure 4:
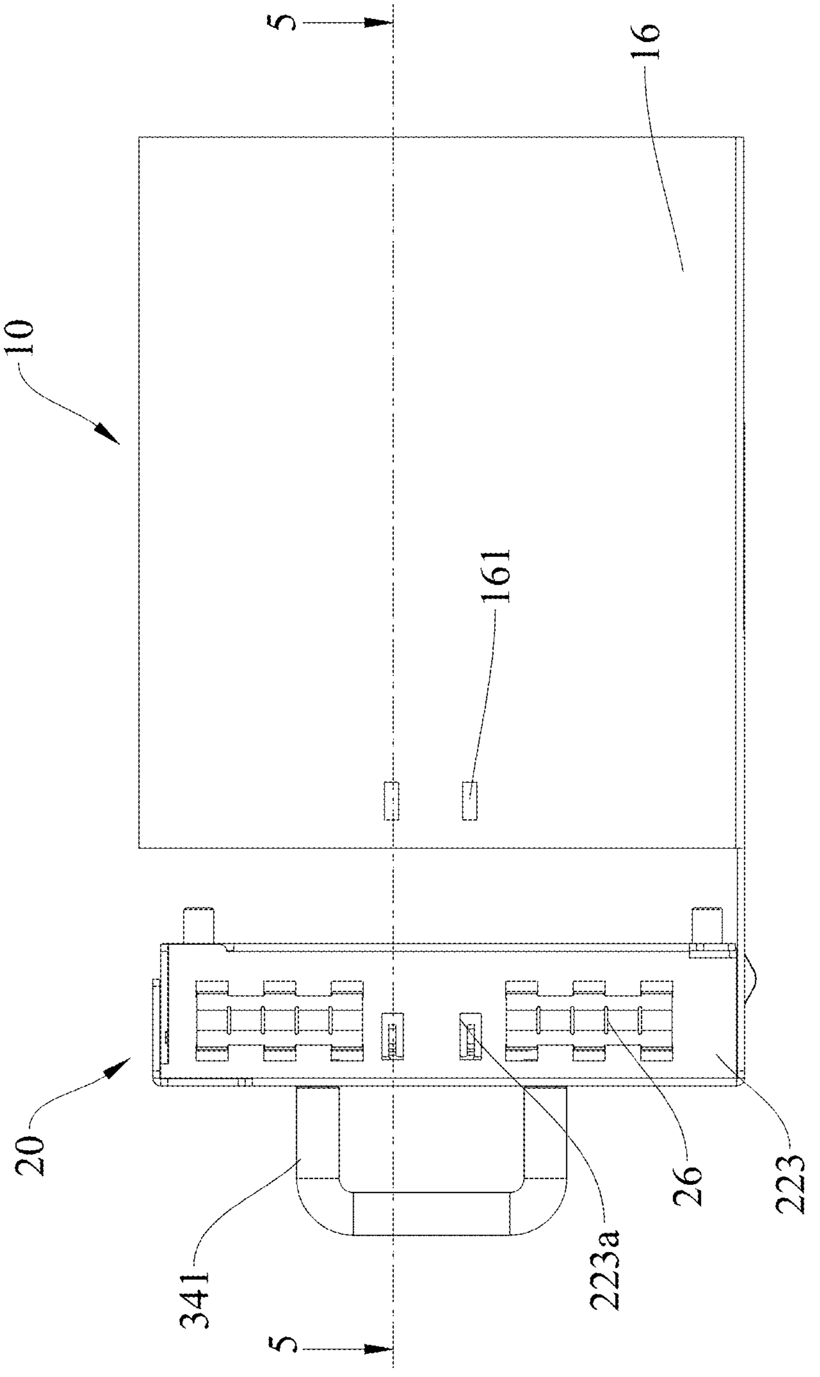
FIG. 4 is a side schematic view of the self-locking module device according to the first embodiment of the present invention.

Referring to FIG. 3, the module base 20 includes a cover body 22, a bottom frame 24, and a plurality of elastic piece groups 26, wherein a bottom end of the cover body 22 is connected to the bottom frame 24. When the module base 20 is combined with the box body 10, the cover body 22 is stuck at the opening 181 and the bottom frame 24 abuts against the bottom board 12. The cover body 22 includes a cover board 221, a top frame 222, and two lateral frames 223, wherein the cover board 221 closes the opening 181. A side of the cover board 221 facing the module space 18 is defined as an inner side, and the other side of the cover board 221 away from the module space 18 is defined as an outer side. A periphery of the cover board 221 has four sides containing a top side, a bottom side, a left side, and a right side. The cover board 221 has a penetrated portion 2211. The left side of the cover board 221 and the right side of the cover board 221 are respectively connected to the two lateral frames 223. Each of the two lateral frames 223 has two through holes 223*a*. In the current embodiment, the bottom frame 24 is a tray; when the module base 20 is combined with the box body 10, the tray protrudes into a bottom side of the module space 18. The penetrated portion 2211 is disposed on a middle of the cover board 221.

When the module base 20 is combined with the box body 10, the two lateral frames 223 respectively abut against the two lateral boards 16 and the two through holes 223*a* of each of the two lateral frames 223 are aligned with the two locking holes 161 of each of the two lateral boards 16. The elastic piece groups 26 are respectively disposed on the two lateral frames 223 and a bottom portion of the bottom frame 24. When the module base 20 is combined with the box body 10, each of the two lateral frames 223 abuts against each of the two lateral boards 16 through the elastic piece groups 26 disposed on the two lateral frames 223 and the bottom frame 24 abuts against bottom board 12 through the elastic piece groups 26 disposed on the bottom portion of the bottom frame 24 for positioning. In other embodiments, the number of the through holes 223*a* of each of the two lateral frames 223 corresponds to the number of the locking holes 161 of each of the two lateral boards 16; when the module base 20 is combined with the box body 10, the through hole 223*a* of each of the two lateral frames 223 corresponds to the locking hole 161 of each of the two lateral boards 16.

Figure 7:
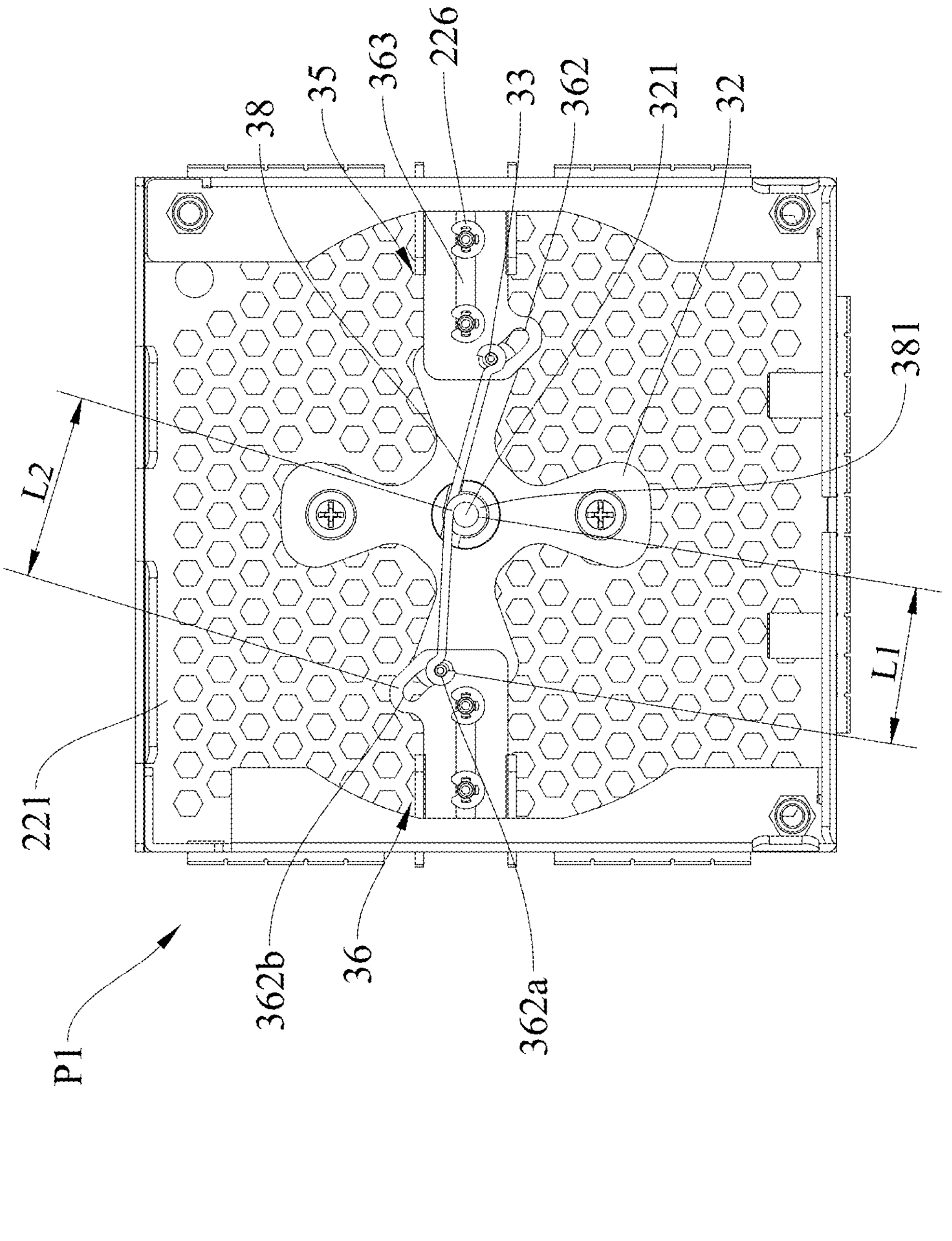
FIG. 7 is a schematic view of the self-locking module device seen in a direction from the module space to the module base, showing that the two latches are located at the first position according to the first embodiment of the present invention.
Figure 8:
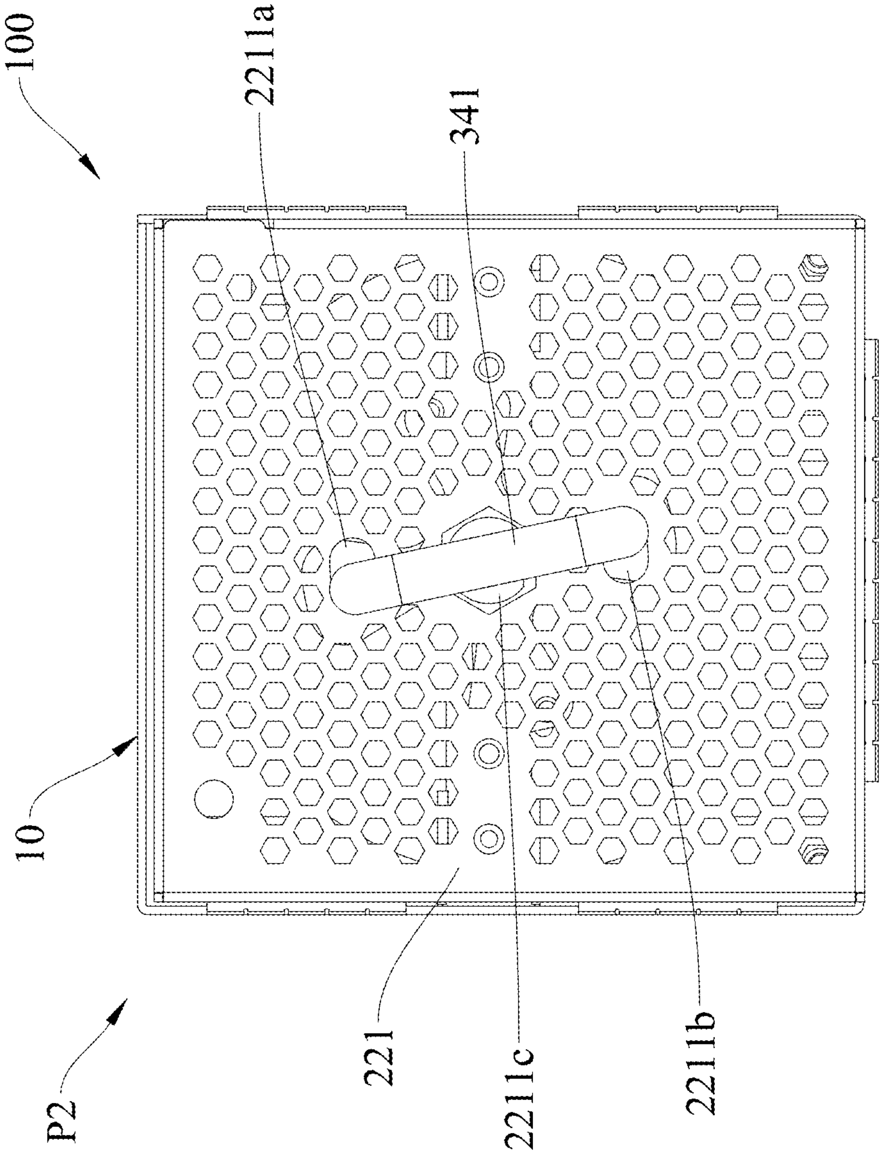
FIG. 8 is a front view of the self-locking module device, showing that the two latches are moved from the first position to the second position according to the first embodiment of the present invention.
Figure 9:
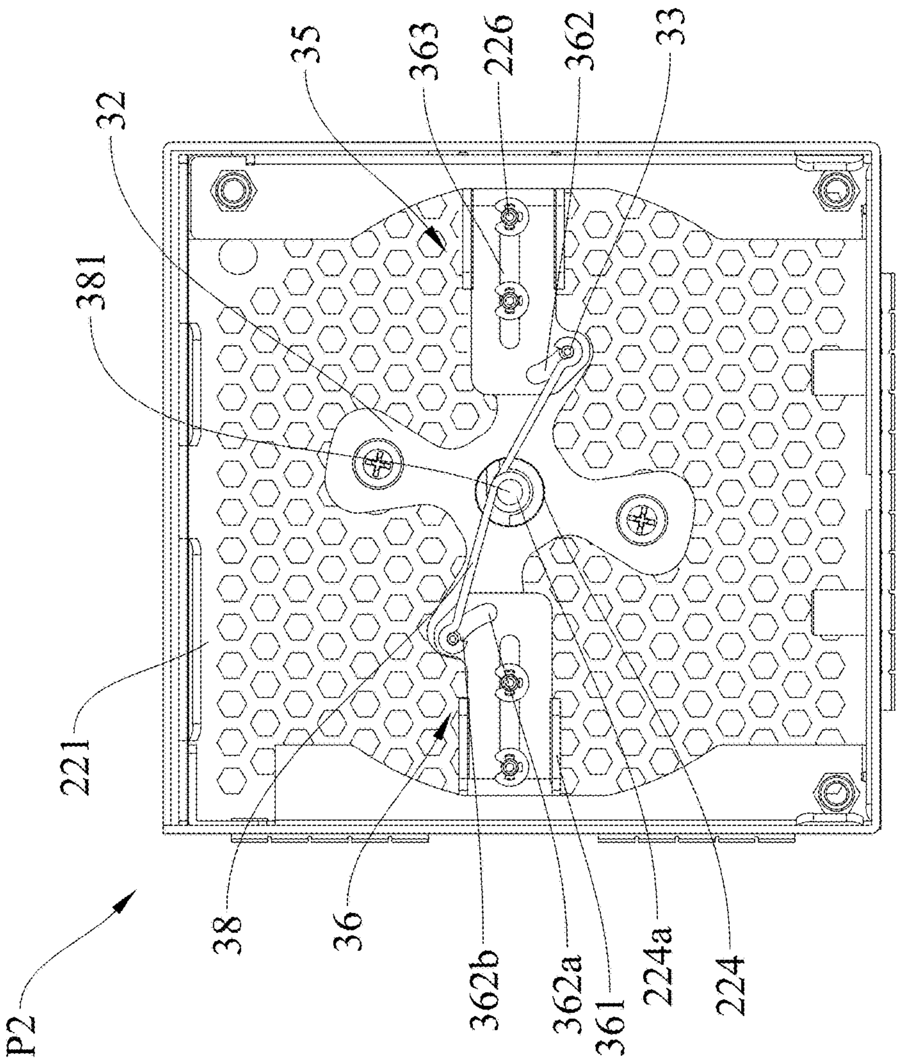
FIG. 9 is a schematic view of the self-locking module device, showing that the two latches are moved from the first position to the second position according to the first embodiment of the present invention.

The rotary driving structure 30 is disposed on the cover body 22 and includes a rotary plate 32, a rotary handle 34, two latches 36, and at least one spring 38. The rotary plate 32 has a rotation center portion 321, wherein a periphery of the rotation center portion 32 is combined with two pins 33. In the current embodiment, the two pins 33 are respectively combined with a left side of the rotary plate 32 and a right side of the rotary plate 32. The rotary plate 32 is disposed on the inner side of the cover board 221. The rotary plate 32 is rotatably disposed on the penetrated portion 2211 through the rotation center portion 321. A part of the rotary handle 34 penetrates through the penetrated portion 2211 and is combined with the rotary plate 32. More specifically, referring to FIG. 7 to FIG. 9, in the first embodiment, the rotary plate 32 is in a cross shape and the rotary handle 34 is a handle 341 having two ends. A non-circular hole 2211*c* is disposed on a middle of the penetrated portion 2211. A first hole 2211*a* is disposed at an upper end of the penetrated portion 2211. A second hole 2211*b* is disposed at a lower end of the penetrated portion 2211. The first hole 2211*a* and the second hole 2211*b* are respectively an arc hole taking the non-circular hole 2211*c* as a center.

The cover body 22 further includes a fixing base 224, wherein the fixing base 224 is fixed to the non-circular hole 2211*c*. The rotation center portion 321 of the rotary plate 32 is an axial hole and fits around the fixing base 224, so that the rotary plate 32 could rotate relative to the fixing base 224. The two ends of the handle 341 respectively penetrate through the first hole 2211*a* and the second hole 2211*b*. The two ends of the handle 341 are respectively fixed to an upper end of the rotary plate 32 and a lower end of the rotary plate 32. The first hole 2211*a* and the second hole 2211*b* allow the handle 341, which penetrates through the first hole 2211*a* and the second hole 2211*b*, to be rotatable relative to the penetrated portion 2211.

The two latches 36 are disposed on the inner side of the cover board 221. The two latches 36 are respectively located on two sides of the rotary plate 32 and respectively correspond to the two pins 33. At least one track device 35 is formed between each of the two latches 36 and the cover board 221, so that each of the two latches 36 could be movable in a straight line. In the current embodiment, the number of the at least one track device 35 corresponds to the number of the at least one latch 36 and includes the two track devices 35. More specifically, each of the two latches 36 is movable between a first position P1 and a second position P2 along each of the two track devices 35. At least one tongue 361 is disposed on an outer end portion of each of the two latches 36 and the number of the tongue 361 of each of the latches 36 corresponds to the number of the locking hole 161 of each of the two lateral boards 16. In the current embodiment, two tongues 361 are disposed on the outer end portion of each of the two latches 36. Each of the two tongues 361 protrudes out of the cover board 221 and is inserted into each of the two locking holes 161. More specifically, the two tongues 361 of each of the two latches 36 penetrate through the two through holes 223*a* of each of the two lateral frames 223 and are inserted into the two locking holes 161 of each of the two lateral boards 16 for positioning.

An inner end portion of each of the two latches 36 includes a displacement hole 362. Each of the two pins 33 penetrates through each of the two displacement holes 362. Each of the two displacement holes 362 is an arc hole and has a first end 362*a* and a second end 362*b*. Each of the two pins 33 is located at the first end 362*a* of each of the two displacement holes 362. A distance between each of the two first ends 362*a* and a center of the rotation center portion 321 is a first length L1. A distance between each of the two second ends 362*b* and the center of the rotation center portion 321 is a second length L2. The second length L2 is greater than the first length L1. When each of the two latches 36 is located at the first position P1, the two tongues 361 of each of the two latches 36 protrude out of the two through holes 223*a* of each of the two lateral frames 223 and are inserted into the two locking holes 161 of each of the two lateral boards. Each of the two track devices 35 has a track hole 363 and two fixing members 226, wherein the track hole 363 is disposed on the corresponding latch 36, and the two fixing members 226 penetrate through the track hole 363 and are fixed to the cover board 221, so that the track hole 363 of each of the two latches 36 could be straight slid in a direction in which the two fixing members 226 are arranged.

In the current embodiment, the at least one spring 38 includes one spring 38. The spring 38 is a torsion spring and has a main body 381, wherein the main body 381 is disposed in a recess 224*a* of the fixing base 224. The spring 38 has two ends adapted to hook the two pins 33 respectively. In this way, the spring 38 is adapted to drive each of the two pins 33 to move towards the corresponding first end 362*a* along the corresponding displacement hole 362.

Figure 5:
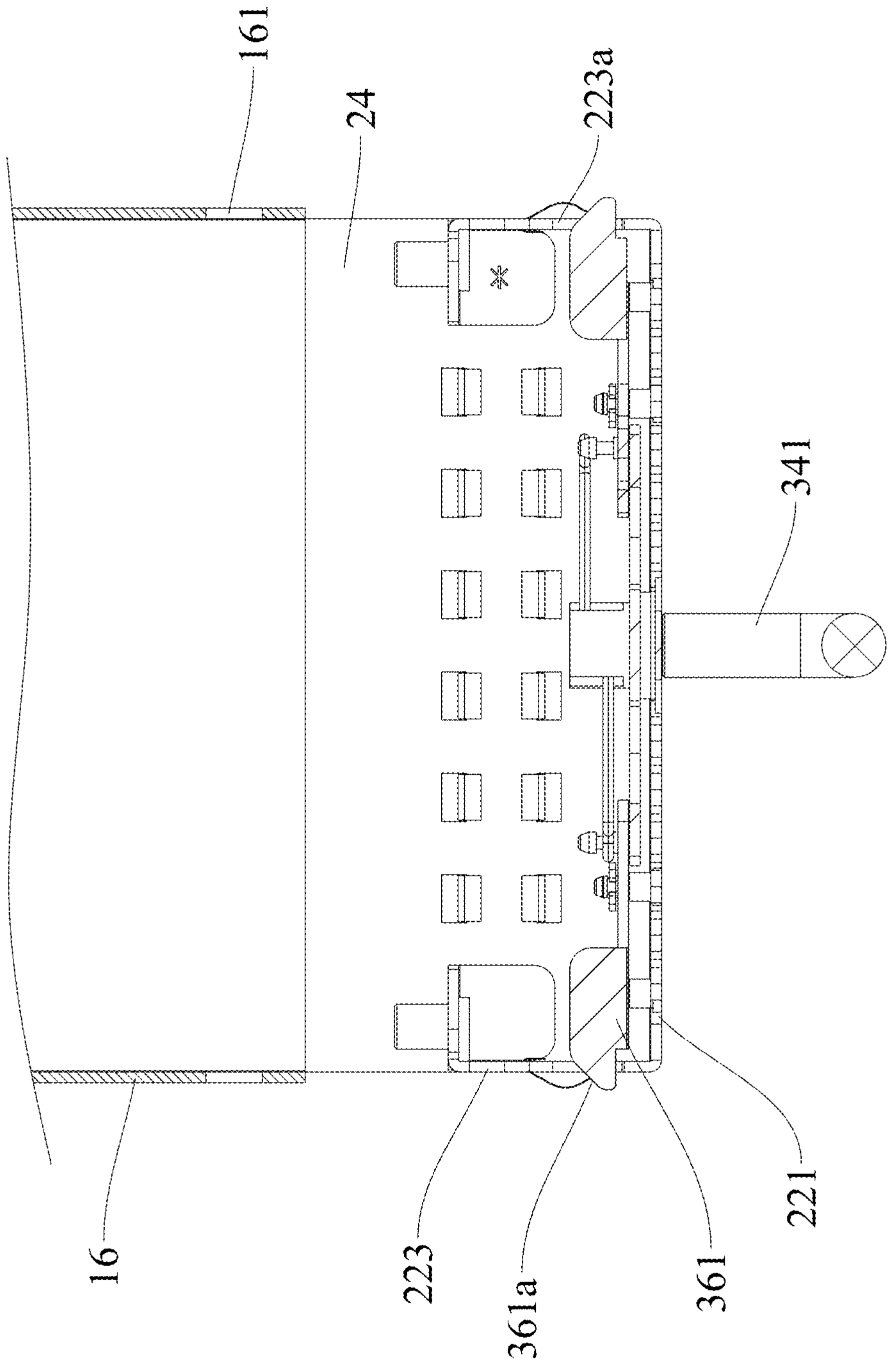
FIG. 5 is a sectional view along the 5-5 line in FIG. 4.
Figure 6:
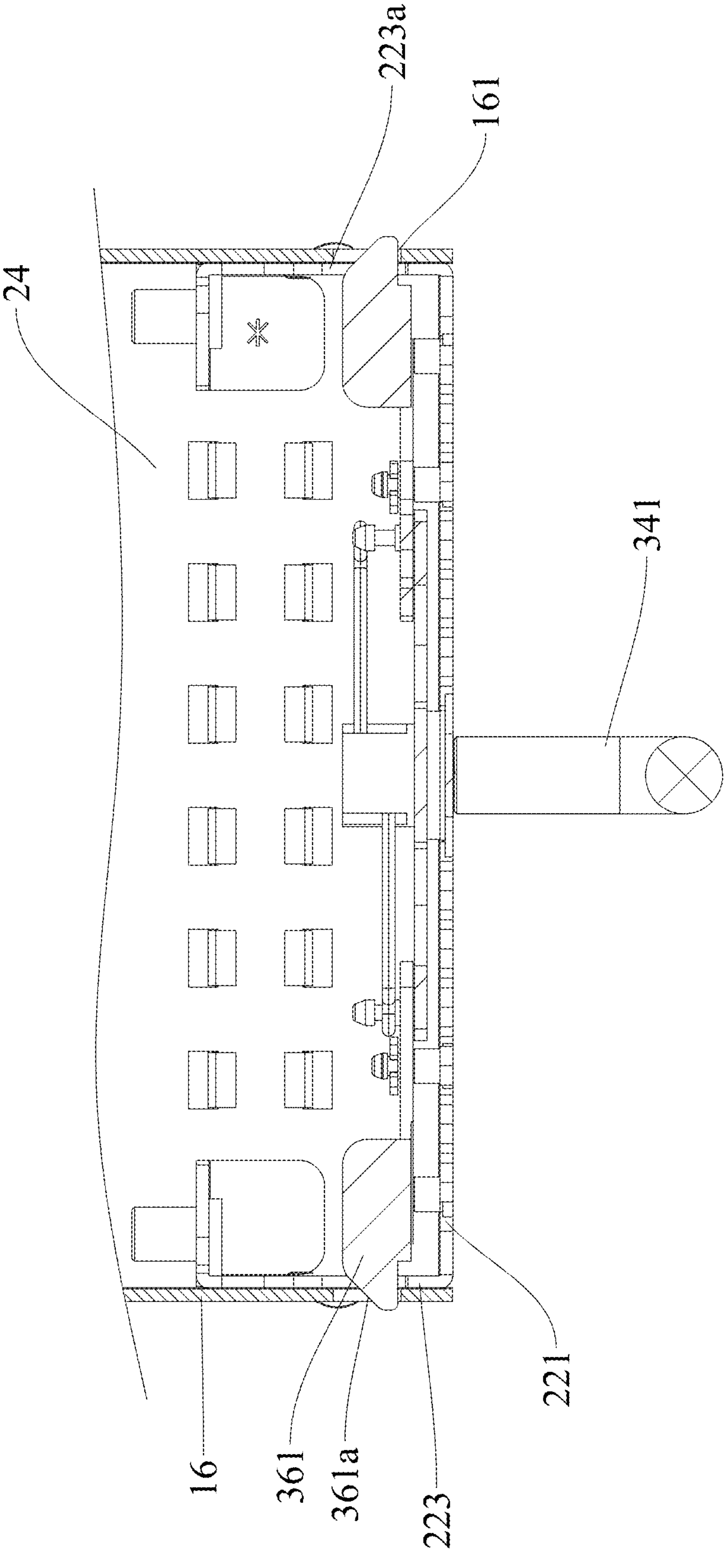
FIG. 6 is a schematic view, showing the box body being combined with the module base in FIG. 5.

Referring to FIG. 5 and FIG. 6, a part of each of the two tongues 361 protruding out of the corresponding through hole 223*a* has an inclined surface 361*a*. When the module base 20 is about to be combined with the box body 10, the module base 20 is moved towards the module space 18; each of the inclined surfaces 361*a* abuts against each of the two lateral boards 16; each of the two lateral boards 16 transmits a force to the two latches 36 for moving to the second position P2 through each of the inclined surfaces 361*a*; each of the inclined surfaces 361*a* is pressed by each of the two lateral boards 16, so that each of the tongues 361 retracts into each of the through holes 223*a;* at that time, the two latches 36 move to the second position P2. Subsequently, the module base 20 continuously moves towards the box body 10; when each of the through holes 223*a* is aligned with each of the locking holes 161, each of the two pins 33 is pushed by a restoring force of the spring 38 to move towards the first ends 362*a* of each of the two displacement holes 362 along each of the two displacement holes 362, so that each of the two latches 36 are driven to return to the first position P1; at that time, each of the tongues 361 and each of the inclined surfaces 361*a* protrude out of each of the through holes 223*a* and are inserted into each of the locking holes 161, so that the module base 20 and the box body 10 are automatically fastened.

When the handle 341 is rotated, the rotary plate 32 located on the inner side of the cover board 221 correspondingly rotates relative to the fixing base 224; the two pins 33 disposed on the two sides of the rotary plate 32 respectively move from the first ends 362*a* of the two displacement holes 362 to the second ends 362*b* of the two displacement holes 362, so that the two latches 36 are driven by the two pins 33 to move from the first position P1 to the second position P2, and each of the two pins 33 compresses each of the two ends of the spring 38. When each of the two latches 36 retracts, the two tongues 361 of each of the two latches 36 sequentially leave the two locking holes 161 of each of the two lateral boards 16 and the two through holes 223*a* of each of the two lateral frames 223, so that the module base 20 and the box body 10 are unlocked and the module base 20 could be pulled out from the box body 10. When the module base 20 is pulled out from the box body 10 and the force is no longer applied to the handle 341, the restoring force of the spring 38 moves the two pins 33 from the second ends 362*b* to the first ends 362*a,* so that the two latches 36 located on the two sides of the rotary plate 32 respectively return from the second position P2 to the first position P1 along the two track devices 35. At that time, the two tongues 361 of each of the two latches 36 protrude out of the two through holes 223*a* of each of the two lateral frames 223.

In the first embodiment, the two latches 36 are disposed on two opposite sides of the rotary driving structure 30. Additionally, in other embodiments, only one latch 36 could also be disposed on one side of the two opposite sides of the rotary driving structure 30. At that time, only one of the two lateral frames 223 corresponding to the latch 36 is provided with the through holes 223*a;* only one of the two lateral boards 16 corresponding to the latch 36 is provided with the locking holes 161; only one pin 33 is disposed on the rotation center portion 321 corresponding to the displacement hole 362 of the latch 36 and is inserted into the displacement hole 362. With such modifications, the module base 20 could move into the box body 10 for fastening automatically or the module base 20 and the box body 10 could be unlocked and the module base 20 could be pulled out from the box body 10 as the same as the first embodiment.

Figure 10:
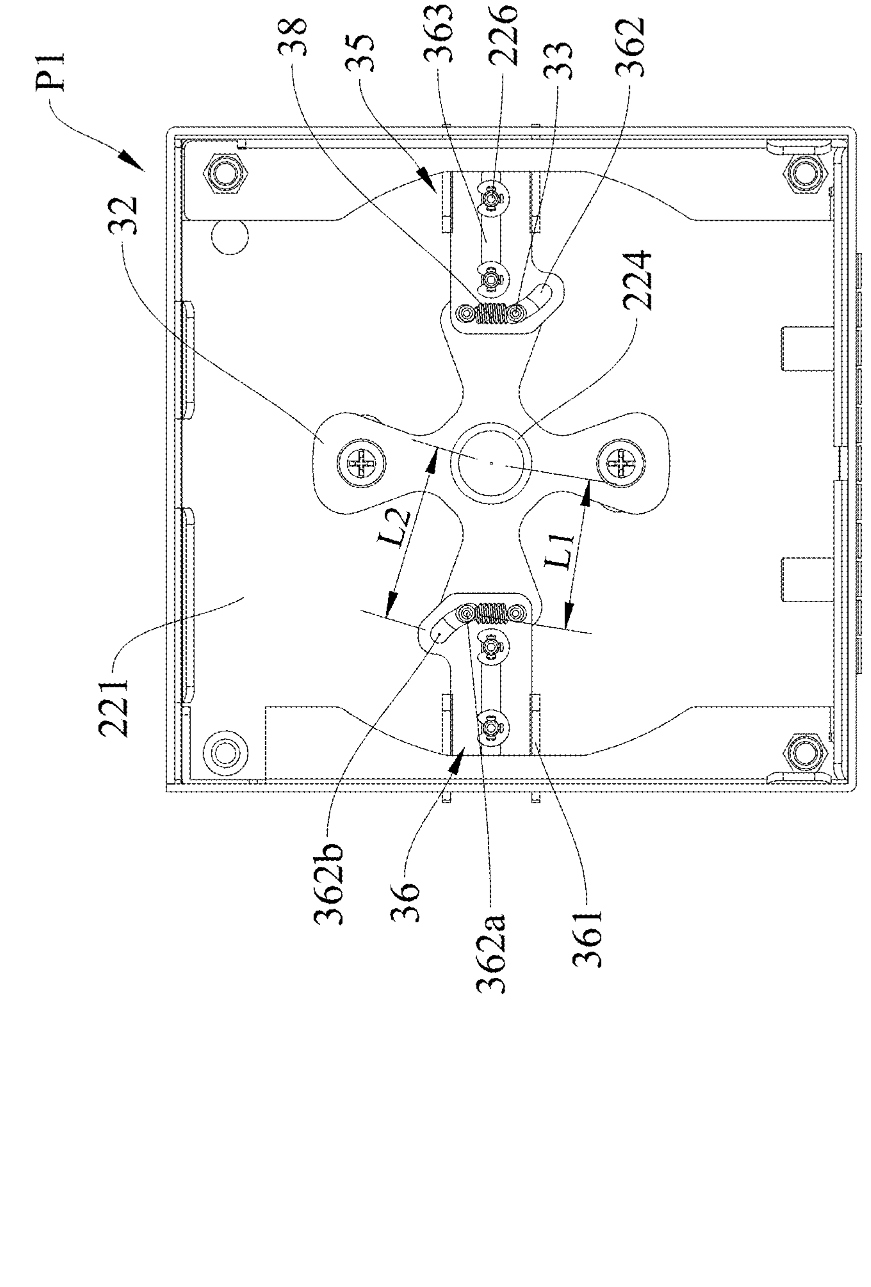
FIG. 10 is a schematic view of the self-locking module device seen in the direction from the module space to the module base according to a second embodiment of the present invention.
Figure 11:
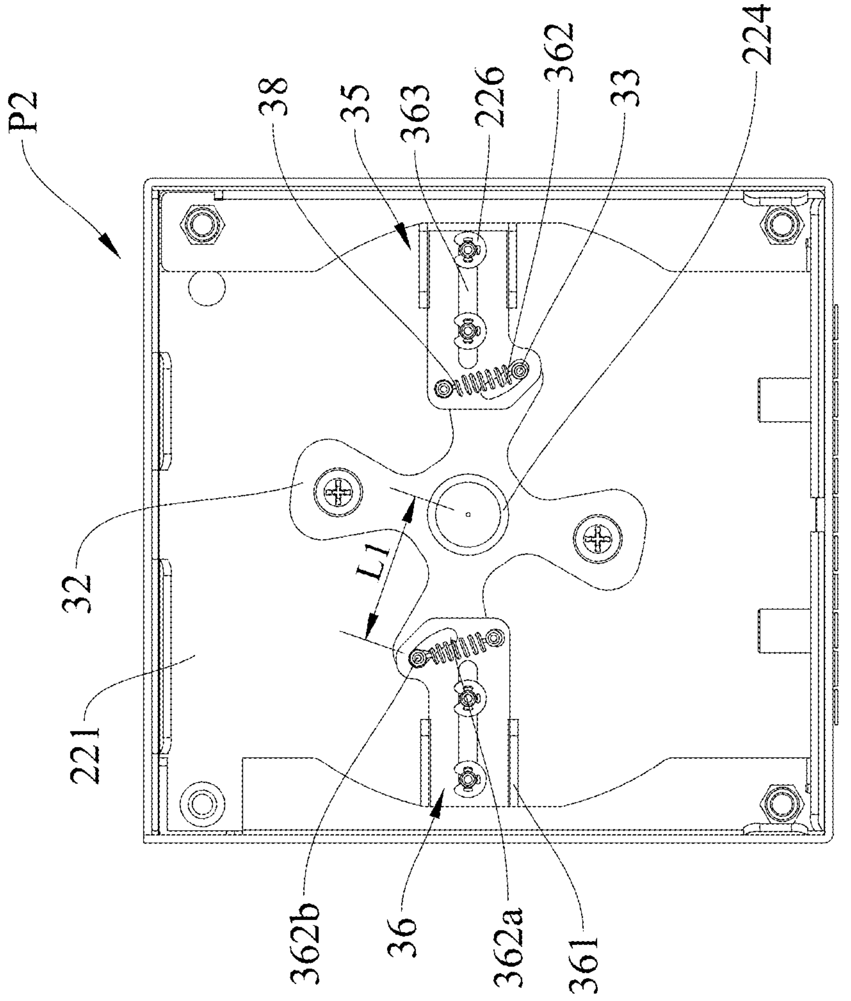
FIG. 11 is a schematic view of the self-locking module device, showing the two latches are moved from the first position to the second position in FIG. 10 according to the second embodiment of the present invention.

A second embodiment of the present invention is illustrated in FIG. 10 and FIG. 11. The difference between the second embodiment and the first embodiment is that in the second embodiment, the at least one spring 38 includes two springs 38 and each of the two springs 38 is a tension spring. In the second embodiment, the two springs 38 are respectively located on the left side of the rotary plate 32 and the right side of the rotary plate 32. One of two ends of one of the springs 38 hooks one of the two pins 33 and the other end of the spring 38 is disposed on one of the latches 36 corresponding to the pin 33. One of two ends of the other spring 38 hooks the other pin 33 and the other end of the other spring 38 is disposed on the other latch 36 corresponding to the other pin 33. When the handle 341 is rotated, the rotary plate 32 located on the inner side of the cover board 221 correspondingly rotates relative to the fixing base 224; the two pins 33 disposed on the two sides of the rotary plate 32 respectively move from the first end 362*a* of the corresponding displacement hole 362 to the second end 362*b* of the corresponding displacement hole 362, and a length of each of the two springs 38 correspondingly increases; at that time, each of the two springs 38 is in a tensile state. When the force is no longer applied to the handle 341, a restoring force of each of the two springs 38 drives the rotary plate 32 and the corresponding pin 33 to restore an original position, so that each of the pins 33 moves from the second end 362*b* of each of the displacement holes 362 to the first end 362*a* of each of the displacement holes 362.

Figure 12:
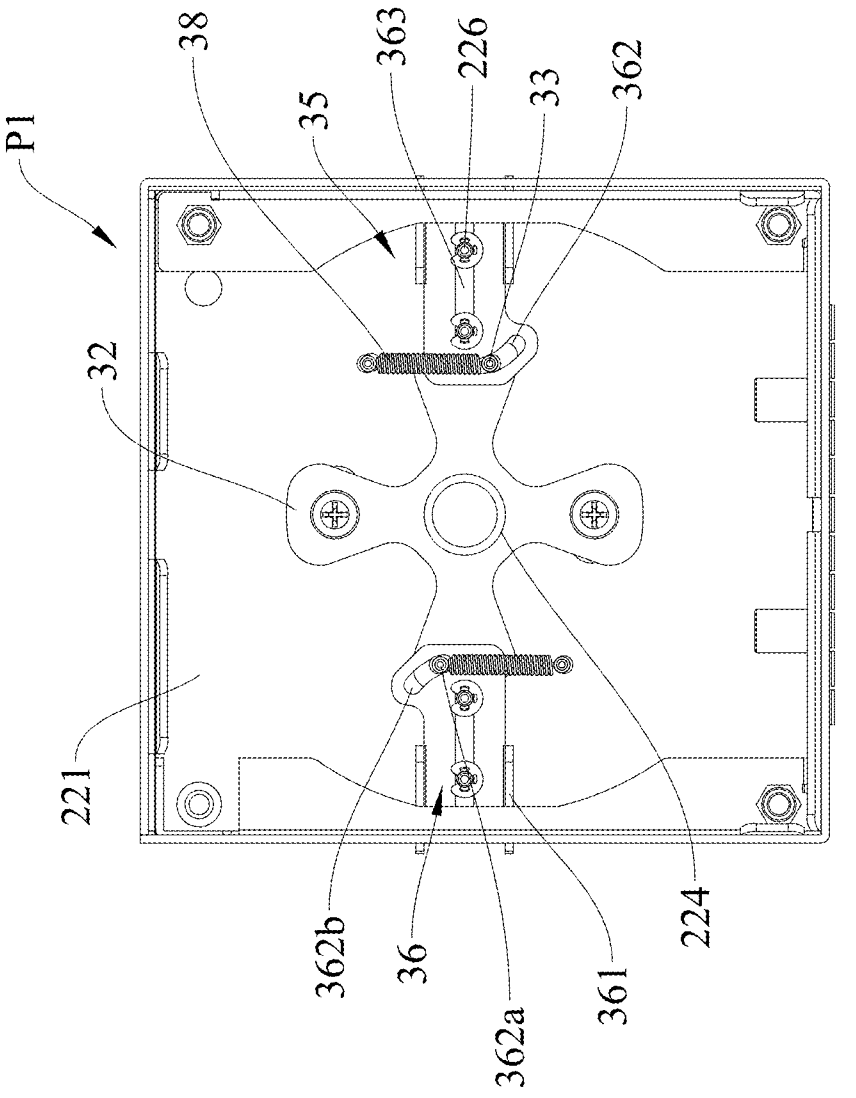
FIG. 12 is a schematic view of the self-locking module device seen in the direction from the module space to the module base according to a third embodiment of the present invention.
Figure 13:
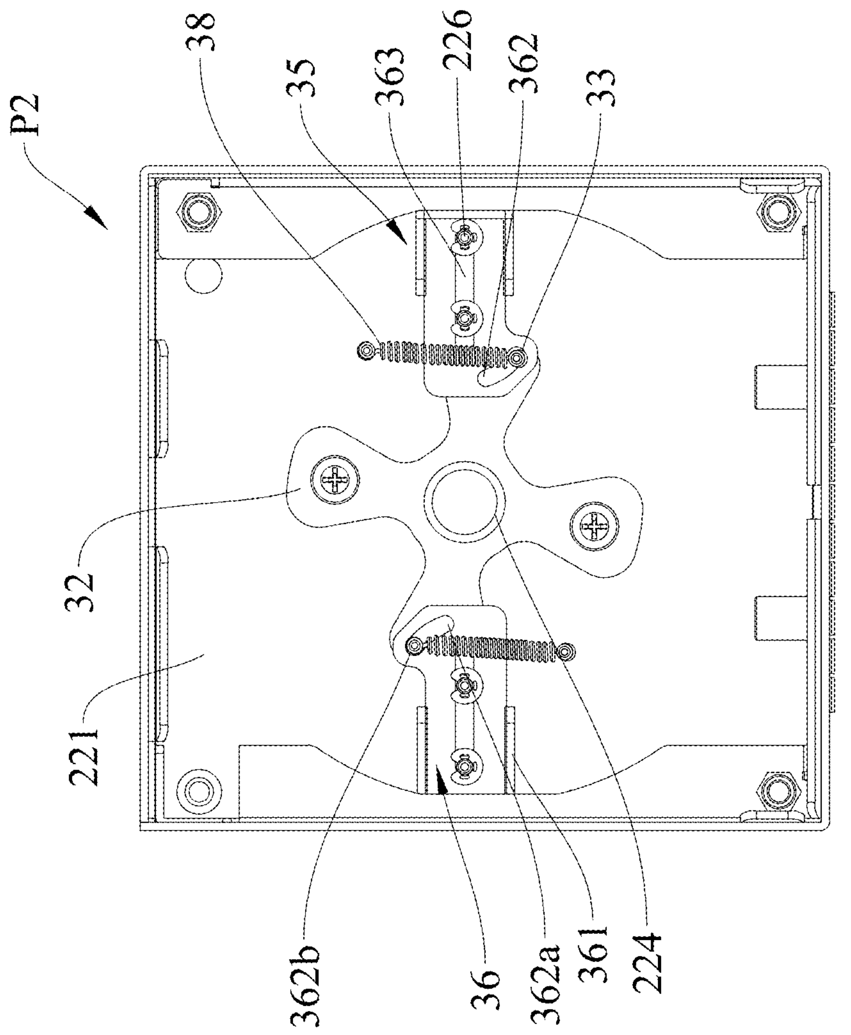
FIG. 13 is a schematic view of the self-locking module device, showing the two latches are moved from the first position to the second position in FIG. 12 according to the third embodiment of the present invention.

A third embodiment of the present invention is illustrated in FIG. 12 and FIG. 13. The difference between the third embodiment and the second embodiment is that in the third embodiment, each of the two springs 38 has two ends, wherein one of the two ends of each of the two springs 38 hooks each of the pins 33 and the other end of each of the two springs 38 is fixedly disposed on a surface of the cover board 221. When the handle 341 is rotated, the two springs 38 could generates a restoring effect that a restoring force of each of the two springs 38 drives the rotary plate 32 and the corresponding pin 33 to restore an original position the same as the second embodiment.

Figure 14:
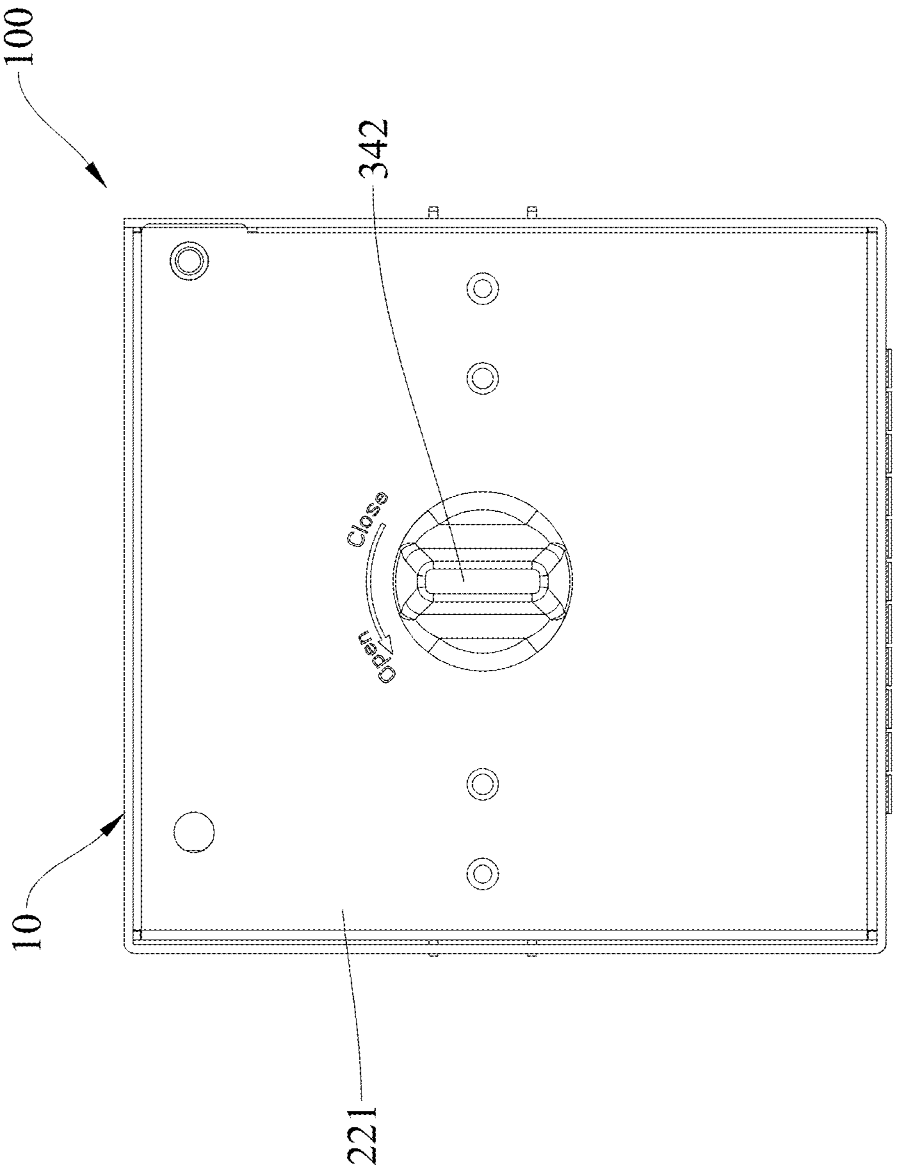
FIG. 14 is a front view of the self-locking module device according to a fourth embodiment of the present invention.
Figure 15:
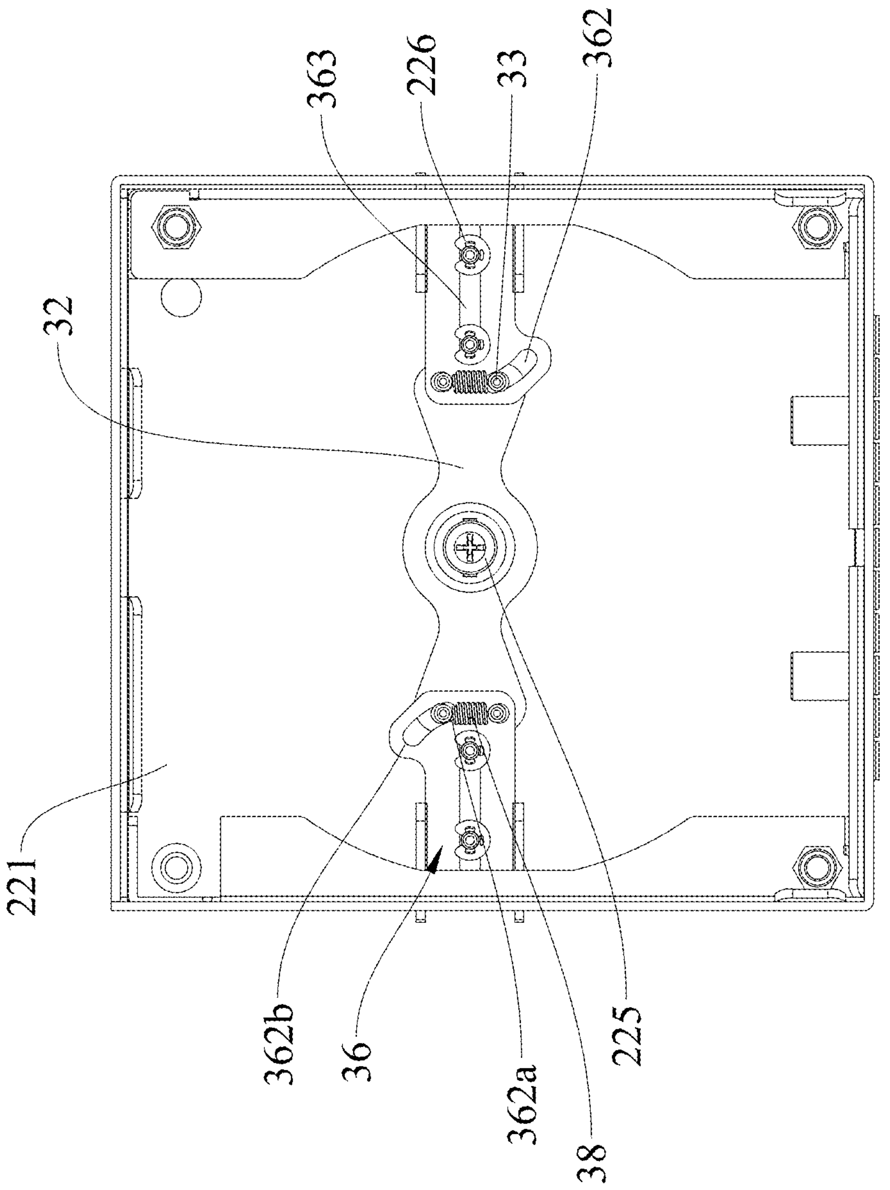
FIG. 15 is a schematic view of the self-locking module device seen in the direction from the module space to the module base according to the fourth embodiment of the present invention.

A fourth embodiment of the present invention is illustrated in FIG. 14 and FIG. 15. The difference between the fourth embodiment and the first embodiment is that in the fourth embodiment, the rotary plate 32 is formed as a straight line; the rotary handle 34 includes a knob 342; the cover body 22 further includes a connecting member 225, wherein the connecting member 225 rotatably penetrates through an axle hole formed on a middle of the penetrated portion 2211 the connecting member 225 has two ends, wherein one of the two ends of the connecting member 225 is fixed to the knob 342 and the other end of the connecting member 225 is fixed to the rotation center portion 321; the connecting member 225 is rotatable relative to the cover board 221; the at least one spring 38 includes two springs 38, wherein each of the two springs 38 is a tension spring; one of the two springs 38 is combined with a left side of the rotary plate 32 and the other spring 38 is combined with a right side of the rotary plate 32; one of two ends of each of the two springs 38 hooks each of the two pins 33 and the other end of each of the two springs 38 is disposed on each of the two latches 36. When the knob 342 is rotated, the connecting member 225 is driven by the knob 342 to rotate relative to the cover board 221 and the rotary plate 32 is correspondingly rotated; the two pins 33 disposed on the left side of the rotary plate 32 and the right side of the rotary plate 32 respectively move from the first end 362*a* of the corresponding displacement hole 362 to the second end 362*b* of the corresponding displacement hole 362; at that time, a length of each of the two springs 38 increases. When the force is no longer applied to the knob 342, a restoring force of each of the two springs 38 is applied to each of the two pins 33, so that each of the two pins 33 returns from the second end 362*b* to the first end 362*a*. In other embodiments, one of the two ends of each of the two springs 38 could also hook each of the two pins 33 and the other end of each of the two springs 38 could be disposed on and fixed to the surface of the cover board 221.

It must be pointed out that the embodiments described above are only some preferred embodiments of the present invention. All equivalent structures which employ the concepts disclosed in this specification and the appended claims should fall within the scope of the present invention.

What is claimed is:

1. A self-locking module device, comprising:

a box body comprising a bottom board, a top board, and two lateral boards, wherein the bottom board, the top board, and the two lateral boards surround to form a module space and an opening communicating with the module space; at least one of the two lateral boards has at least one locking hole;

a module base comprising a cover body and a bottom frame, wherein the cover body is connected to the bottom frame; when the module base is combined with the box body, the cover body is stuck at the opening and the bottom frame abuts against the bottom board; the cover body has a cover board, wherein the cover board closes the opening; a side of the cover board facing the module space is defined as an inner side, and the other side of the cover board away from the module space is defined as an outer side; the cover board has a penetrated portion; and a rotary driving structure disposed on the cover body and comprising a rotary plate, a rotary handle, at least one latch, and at least one spring, wherein the rotary plate has a rotation center portion; at least one pin is combined with a periphery of the rotation center portion of the rotary plate; the rotary plate is disposed on the inner side of the cover board and the rotation center portion of the rotary plate is rotatably disposed on the penetrated portion; a part of the rotary handle penetrates through the penetrated portion and is combined with the rotary plate; at least one track device is formed between the at least one latch and the cover board and the at least one latch is movable in a straight line; an outer end portion of the at least one latch has at least one tongue, wherein the at least one tongue protrudes out of a periphery of the cover board and is inserted into the at least one locking hole; an inner end portion of the at least one latch comprises a displacement hole; the at least one pin penetrates through the displacement hole of the at least one latch; the displacement hole has a first end and a second end, wherein the at least one pin is located at the first end; a distance between the first end and a center of the rotation center portion is a first length; a distance between the second end and the center of the rotation center portion is a second length; the second length is greater than the first length; the at least one spring is adapted to drive the at least one pin to move towards the first end of the displacement hole of the at least one latch; when the module base is about to be combined with the box body, the at least one tongue abuts against at least one of the two lateral boards and moves inward, and at least one of the two lateral boards transmits a force to the at least one latch for moving inward through the at least one tongue; when the at least one tongue is aligned with the at least one locking hole, the at least one spring drives the at least one latch to move outward through the at least one pin, so that the at least one tongue is inserted into the at least one locking hole.

2. The self-locking module device as claimed in claim 1, wherein each of the two lateral boards has the at least one locking hole, and a number of the at least one locking hole of each of the two lateral boards is two; a number of the at least one latch of the rotary driving structure is two; the at least one pin combined with the periphery of the rotation center portion of the rotary plate comprises two pins; the two latches are disposed on the inner side of the cover board and are respectively located on two sides of the rotary plate; a number of the at least one track device is two; each of the two latches is movable between a first position and a second position along each of the two track devices; a number of the at least one tongue of the outer end portion of each of the two latches is two; when each of the two latches is located at the first position, the two tongues protrude out of the periphery of the cover board and are inserted into the two locking holes.

3. The self-locking module device as claimed in claim 2, wherein each of the two track devices has a track hole and a plurality of fixing members; the track hole of each of the two track devices is disposed on each of the two latches; the plurality of fixing members of each of the two track devices penetrate through the track hole of each of the two track devices and is fixed to the cover board.

4. The self-locking module device as claimed in claim 3, wherein the rotary handle is a handle having two ends; a non-circular hole is disposed on a middle of the penetrated portion; a first hole is disposed on one of two opposite sides of the penetrated portion and a second hole is disposed on the other side of the penetrated portion; the first hole and the second hole are respectively an arc hole; a fixing base is fixed to the non-circular hole; the rotation center portion of the rotary plate is an axial hole and fits around the fixing base, so that the rotary plate is rotatable relative to the fixing base; the two ends of the handle respectively penetrate through the first hole and the second hole and are fixed to the rotary plate; the first hole and the second hole allow the handle to rotate relative to the penetrated portion.

5. The self-locking module device as claimed in claim 3, wherein the rotary handle is a knob; the penetrated portion of the cover body is a hole; a connecting member rotatably penetrates through the penetrated portion; the connecting member has two ends, wherein one of the two ends of the connecting member is fixed to the knob and the other end of the connecting member is fixed to the rotation center portion of the rotary plate.

6. The self-locking module device as claimed in claim 5, wherein the at least one spring are two tension springs; each of the two tension springs has two ends, wherein one of the two ends of each of the two tension springs hooks each of the two pins and the other end of each of the two tension springs is combined with each of the two latches.

7. The self-locking module device as claimed in claim 5, wherein the at least one spring are two tension springs; each of the two tension springs has two ends, wherein one of the two ends of each of the two tension springs hooks each of the two pins and the other end of each of the two tension springs is combined with the cover board.

8. The self-locking module device as claimed in claim 3, wherein the cover body further comprises two lateral frames; two sides of the cover board are respectively connected to each of the two lateral frames; each of the two lateral frames has two through holes, wherein the two through holes of each of the two lateral frames are adapted to be penetrated by the two tongues each of the two latches; when the module base is combined with the box body, the two lateral frames abut against the two lateral boards and the two through holes of each of the two lateral frames are aligned with the two locking holes of each of the two lateral boards.

9. The self-locking module device as claimed in claim 8, wherein the module base further comprises a plurality of elastic piece groups; the plurality of elastic piece groups are disposed on the two lateral frames and a bottom of the bottom frame; when the module base is combined with the box body, each of the two lateral frames abuts against each of the two lateral boards through the plurality of elastic piece groups disposed on each of the two lateral frames and the bottom frame abuts against the bottom board through the plurality of elastic piece groups disposed on the bottom frame.

10. The self-locking module device as claimed in claim 4, wherein the at least one spring is a torsion spring; the torsion spring has a main body; the fixing base has a recess; the main body is disposed in the recess of the fixing base; the torsion spring has two ends, wherein the two ends of the torsion spring respectively hook the two pins.

11. The self-locking module device as claimed in claim 4, wherein the at least one spring are two tension springs; each of the two tension springs has two ends, wherein one of the two ends of each of the two tension springs hooks each of the two pins and the other end of each of the two tension springs is combined with each of the two latches.

12. The self-locking module device as claimed in claim 4, wherein the at least one spring are two tension springs; each of the two tension springs has two ends, wherein one of the two ends of each of the two tension springs hooks each of the two pins and the other end of each of the two tension springs is combined with the cover board.

* * * * *